United States Patent [19]
Imura

[11] Patent Number: 5,848,300
[45] Date of Patent: Dec. 8, 1998

[54] EXPOSURE CONTROL DEVICE FOR CAMERA

[75] Inventor: Yoshio Imura, Kawasaki, Japan

[73] Assignee: Nikon Corporation, Tokyo, Japan

[21] Appl. No.: 709,813

[22] Filed: Sep. 10, 1996

[30] Foreign Application Priority Data

Sep. 13, 1995 [JP] Japan .................................. 7-235310

[51] Int. Cl.⁶ .................................................. G03B 17/00
[52] U.S. Cl. ............................................................ 396/55
[58] Field of Search ........................................ 396/55, 52

[56] References Cited

U.S. PATENT DOCUMENTS

| | | | |
|---|---|---|---|
| 5,084,724 | 1/1992 | Maeno | 396/55 |
| 5,220,375 | 6/1993 | Ishida et al. | 396/55 |
| 5,231,445 | 7/1993 | Onuki et al. | 396/55 |
| 5,245,378 | 9/1993 | Washisu | 396/55 |
| 5,353,091 | 10/1994 | Ishida et al. | 354/410 |
| 5,499,068 | 3/1996 | Satoh et al. | 396/55 |
| 5,576,787 | 11/1996 | Kai et al. | 396/55 |

FOREIGN PATENT DOCUMENTS 3-24529  2/1991  Japan .

Primary Examiner—Russell E. Adams

[57] ABSTRACT

An exposure control device for a camera comprises a correction unit for correcting image vibration, a discrimination unit for discriminating whether the correction by the correction unit is possible, a determination unit for determining an exposure condition, a generation unit for generating a signal for effecting a photographing operation by a predetermined photographing method, and a selection unit for causing the generation unit to generate the signal for effecting the photographing operation with the predetermined photographing method, in case the discrimination unit identifies that the correction by the correction unit is impossible and the exposure condition determined by the determination unit satisfies a first discriminating condition, and in case the discrimination unit identifies that the correction by the correction unit is possible and the exposure condition determined by the discrimination unit satisfies a second discriminating condition.

8 Claims, 9 Drawing Sheets

EXPOSURE CONTROL DEVICE FOR CAMERA

BACKGROUND OF THE INVENTION

1. Field of the Invention

The present invention relates to an exposure control device for a camera provided with an image vibration correcting device.

2. Related Background Art

The Japanese Patent Application Laid-Open No. 3-24529 has disclosed certain exposure control devices for use in a camera, including one that activates image vibration correcting means and one that does not activate such means. The latter exposure control device, not activating the image vibration correcting means, controls the shutter speed at a flash-synchronized photographing operation at a predetermined limit speed for image vibration not to delay the shutter speed over the predetermined limit speed, thereby correcting the image vibration in so-called slow-sync photographing operation. The image vibration limit speed is defined, in the specification of the above-mentioned patent application, by a factor of focal length (1/focal length).

On the other hand, the former exposure control device, activating the image vibration correcting means, effects control with a shutter speed slower than the above-mentioned image vibration limit speed, thereby enabling an effective slow-sync flash photographing operation with correcting of the image vibration. However, the shutter speed at the photographing operation is increased to the highest speed synchronizable with the flash emission if the image vibration is judged not correctable even with the activation of the image vibration correcting means.

The exposure control device disclosed in the above-mentioned Japanese Patent Application Laid-Open No. 3-24529, however controls the shutter speed uniformly to "1/focal length" or to the flash-synchronizable highest speed. Stated differently the shutter speed is limited to only one value, so that the photographing luminance range of the object is inevitably limited. For this reason the freedom of photographing is significantly restricted even if the image vibration can be corrected.

SUMMARY OF THE INVENTION

An object of the present invention is to provide an exposure control device for use in a camera, enabling appropriate control of the photographing method and the exposure condition against image vibration.

The above-mentioned object can be attained, according to the present invention, by an exposure control device for a camera, comprising a correction unit for correcting the image vibration, a discrimination unit for discriminating whether the correction by the correction unit is possible, a determination unit for determining an exposure condition, a generation unit for generating a signal for effecting the photographing operation with a predetermined photographing method, and a selection unit for causing the generation unit to generate the above-mentioned signal for effecting the photographing operation with the predetermined photographing method in case the discrimination unit identifies that the correction by the correction unit is impossible and the exposure condition determined by the determination unit satisfies a first discriminating condition, and causing the generation unit to generate the above-mentioned signal for effecting the photographing operation with the predetermined photographing method in case the discrimination unit identifies that the correction by the operation unit is possible and the exposure condition determined by the determination unit satisfies a second discriminating condition.

The above-mentioned predetermined photographing method is advantageously a flash-synchronized photographing method.

Also the above-mentioned exposure condition is advantageously a shutter speed.

The selection unit is advantageously adapted to cause the generation unit to generate the above-mentioned signal for effecting the photographing operation with the predetermined photographing method in case the discrimination unit identifies that the correction by the operation unit is impossible and the shutter speed determined by the determined unit is slower than a first shutter speed, and also in case the discrimination unit identifies that the correction by the correction unit is possible and the shutter speed determined by the determination unit is slower than a second shutter speed which is slower than the first shutter speed.

The above-mentioned exposure control device for a camera advantageously further comprises a limiting unit for limiting the exposure condition determined by the determination unit so as to satisfy the first exposure condition in case the discrimination unit identifies that the correction by the correction unit is impossible and for limiting the exposure condition determined by the discrimination unit so as to satisfy the second exposure condition in case the discrimination unit identifies that the correction by the correction unit is possible.

Another object of the present invention is to provide an exposure control device for a camera, enabling appropriate control of the flash photographing operation and the shutter speed against image vibration, thereby providing a high freedom for the photographing operation.

The above-mentioned object can be attained, according to the present invention, by an exposure control device for a camera, comprising an image vibration correcting unit for correcting the image vibration and by detecting the image vibration and driving an image vibration correcting optical system according to the result of detection, an image vibration correction discriminating unit for discriminating whether the correction of image vibration by the image vibration correcting unit is possible, a shutter speed determination unit for determining a shutter speed, a flash photographing signal generation unit for generating a signal for effecting a flash photographing operation, and a flash photographing selection unit for causing the flash photographing signal generation unit to generate the above-mentioned flash photographing signal, in case the image vibration correction discriminating unit identifies that the correction of image vibration is impossible and the shutter speed determined by the shutter speed determination unit is slower than a first shutter speed for discriminating image vibration and in case the image vibration correction discriminating unit identifies that the correction of image vibration is possible and the shutter speed determined by the shutter speed determination unit is slower than a second shutter speed for discriminating image vibration which is slower than the above-mentioned first image vibration discriminating shutter speed.

The above-mentioned exposure control device for a camera may further comprise a shutter speed limiting unit for limiting the shutter speed, determination by the shutter speed determining unit, so as not to be slower than a first image vibration limiting shutter speed in case the image vibration correction discriminating unit identifies that the correction of image vibration is impossible, and for limiting the shutter speed, determined by the shutter speed determining unit, so as not to be slower than a second image vibration limiting shutter speed which is slower than the first image vibration limiting shutter speed in case the image vibration correction discriminating unit identifies that the correction of image vibration is possible.

DESCRIPTION OF THE PREFERRED EMBODIMENTS

Now the exposure control device of the present invention for use in a camera will be clarified in detail by preferred embodiments thereof, with reference to the attached drawings.

[First Embodiment]

Figure 1:
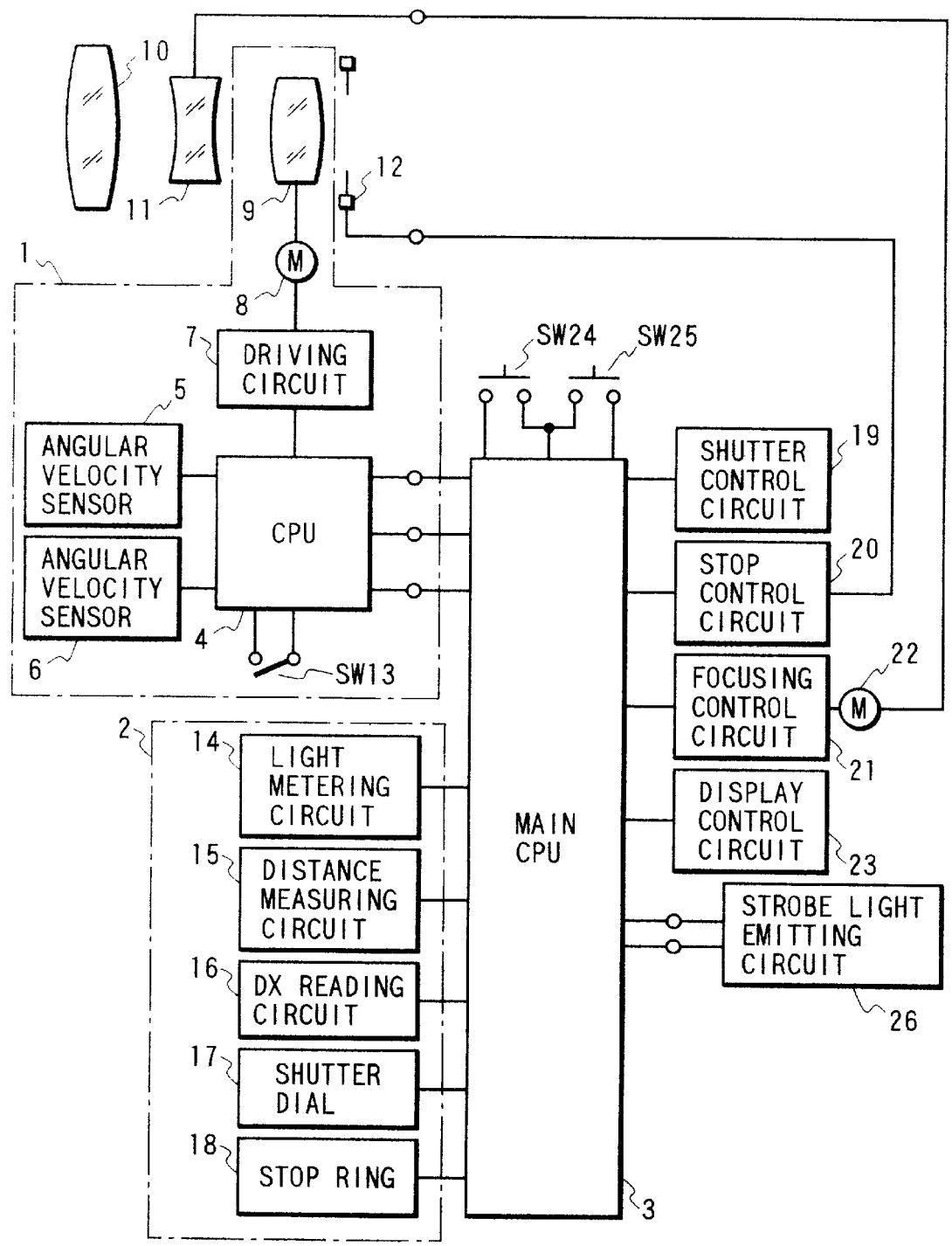
FIG. 1 is a block diagram of a first embodiment of the exposure control device for camera of the present invention.

FIG. 1 is a block diagram showing the circuit configuration of an exposure control device for a camera, constituting a first embodiment of the present invention, wherein the exposure control device is principally composed of an image vibration correcting unit 1, an exposure calculation unit 2, and a main CPU 3. The image vibration correcting unit 1 has a function of correcting the image vibration at the photographing operation and also serves as a discrimination unit for discriminating whether the correction of image vibration is possible. The image vibration correcting unit 1 is principally constructed with a CPU 4, to which connected are an angular velocity sensors 5, 6 serving as image vibration detectors, a driving circuit 7 etc.

The driving circuit 7 is connected to a motor 8, which corrects the image vibration by driving a vibration correcting lens 9, constituting a part of the photographing lens, so as to become eccentric with respect to the optical axis. Though only one motor 8 is illustrated, there are in fact provided two motors for driving the vibration correcting lens in the vertical and lateral directions. The phototaking lens is composed of a first lens 10, a focusing lens 11, a vibration correcting lens 9 and diaphragm blades 12.

The angular velocity sensors 5, 6 respectively detect the vibrations in the vertical and horizontal directions, and the CPU 4 calculates the amount of image vibration, based on the result of such detection, the focal length of the phototaking lens and the phototaking distance. The focal length is stored in the CPU 4, and the phototaking distance is entered into the CPU 4 from a distance measuring circuit 15 to be explained later. The CPU 4 further calculates the drive amount of the vibration correcting lens 9 based on thus calculated amount of image vibration, and sends a signal to the driving circuit 7 for driving the motor 8 by the calculated value. The vibration correcting lens 9 is moved a desired distance by the driving circuit 7. The CPU 4 is connected to an image vibration control release switch SW 13, and effects the image vibration correcting control or not respectively if the above-mentioned switch is turned off or on.

The main CPU 3 constitutes the exposure calculation unit 2 together with a light metering circuit 14, a distance measuring circuit 15, a DX reading circuit 16, a shutter dial 17 and a diaphragm stop ring 18, and calculates the shutter speed and the aperture value, based on the object luminance entered from the light metering circuit 14, the phototaking distance entered from the distance measuring circuit 15, the film speed entered from the DX reading circuit 16 etc. The main CPU 3 is further connected to a shutter control circuit 19 for controlling an unrepresented shutter.

A stop control circuit 20 connected to the main CPU 3 controls the aperture of the diaphragm blades 12 of the photographing lens, and a focusing control circuit 21 controls a motor 22 to drive the focusing lens 11 based on the result of distance measurement by the distance measuring circuit 15. The main CPU 3 is also connected to a display control circuit 23, which displays the shutter speed, aperture value etc. on an unrepresented LCD incorporated for example in the view finder. The main CPU 3 is further connected to switches SW 24, SW 25 and a strobe light emitting circuit 26. The switch SW 24 is a half-stroke switch which is turned on by a half-stroke depression of an unrepresented shutter release button, and the switch SW 25 is a full-stroke switch which is turned on by a full-stroke depression of the shutter release button. The strobe light emitting circuit 26 is connected to an unrepresented strobe flash unit and controls the light emission thereof in response to a flash photographing signal of the main CPU 3.

Figure 2A:
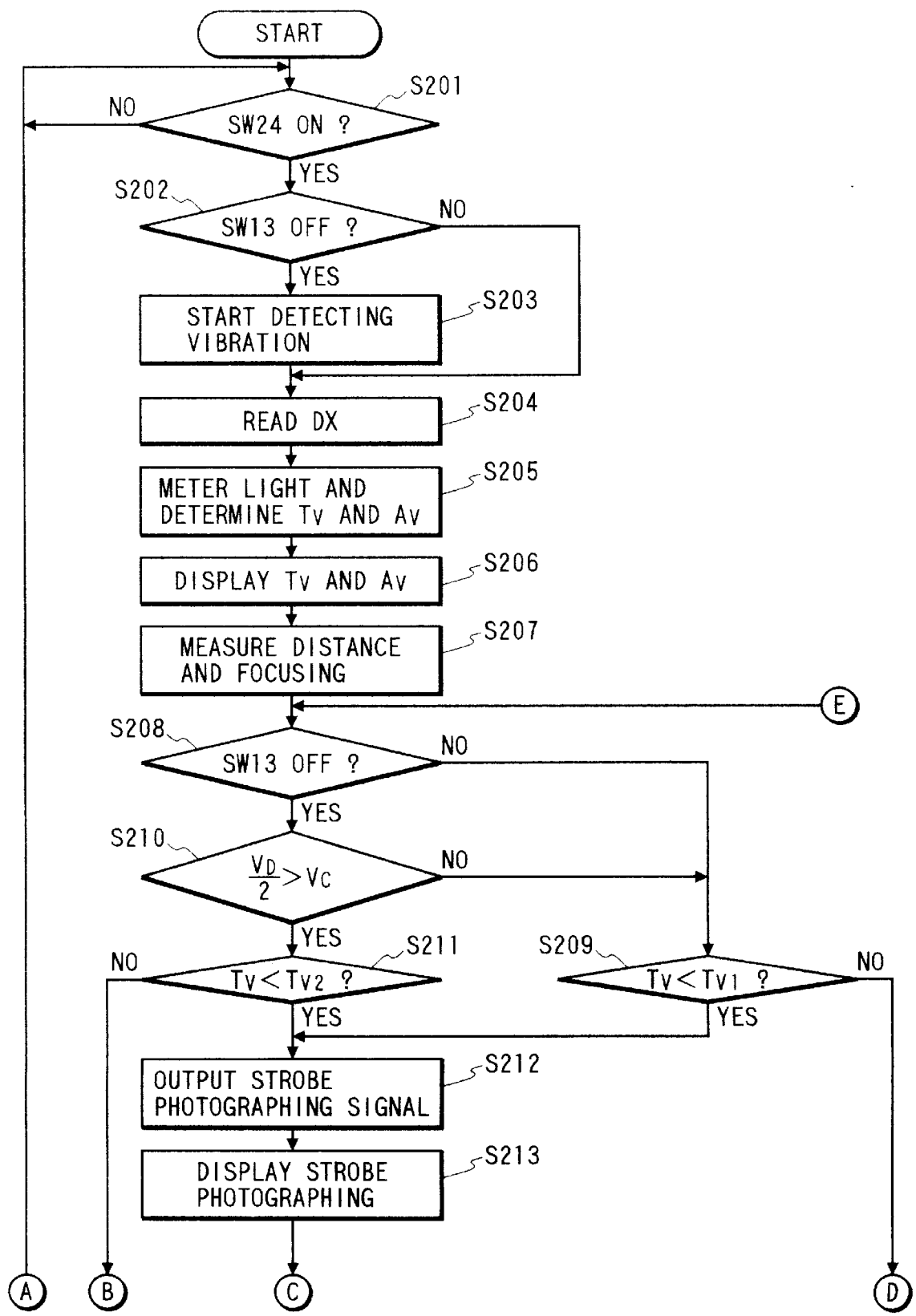
FIGS. 2A and 2B are flow charts showing the function of the exposure control device of the first embodiment.
Figure 2B:
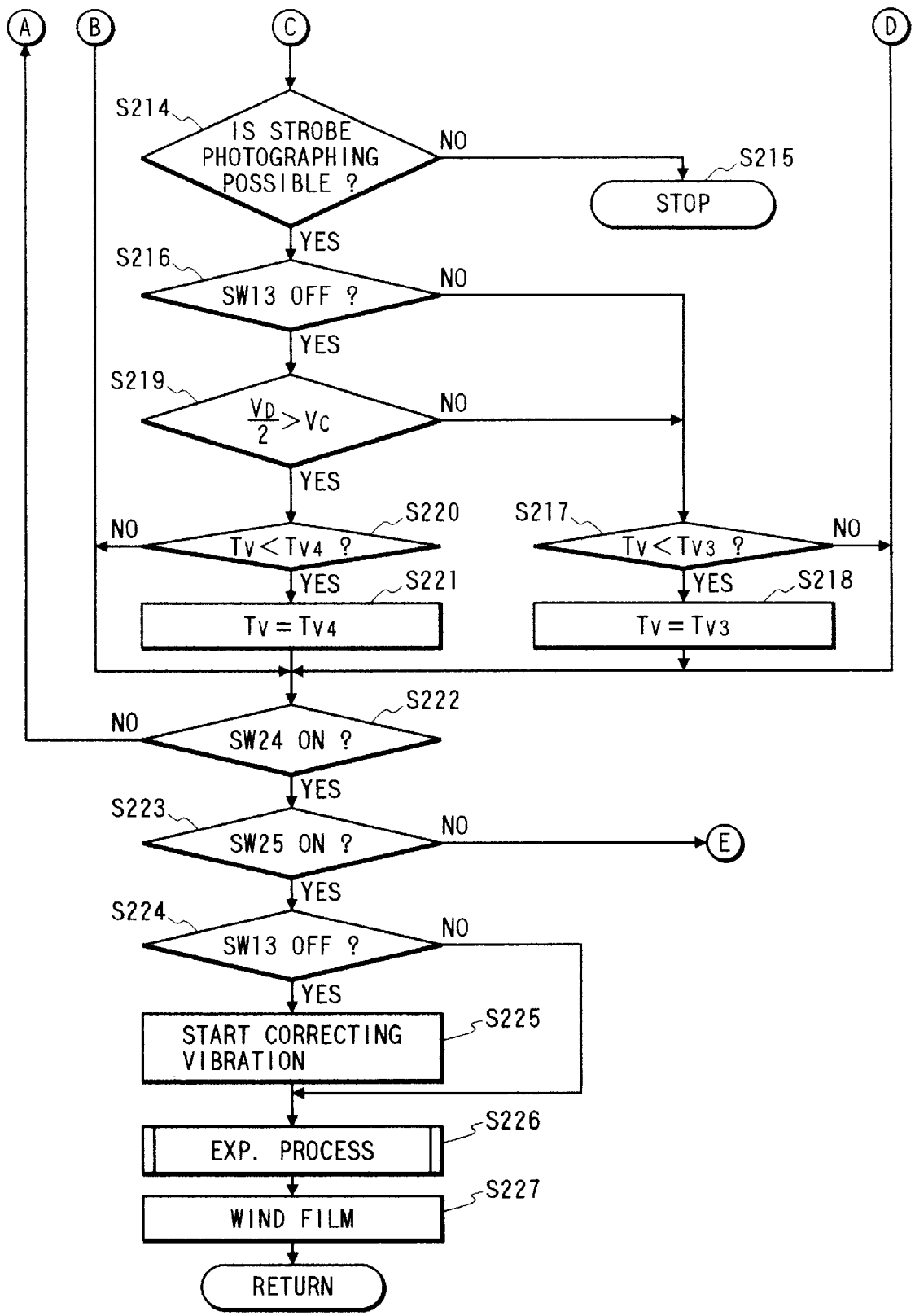
Figure 3:
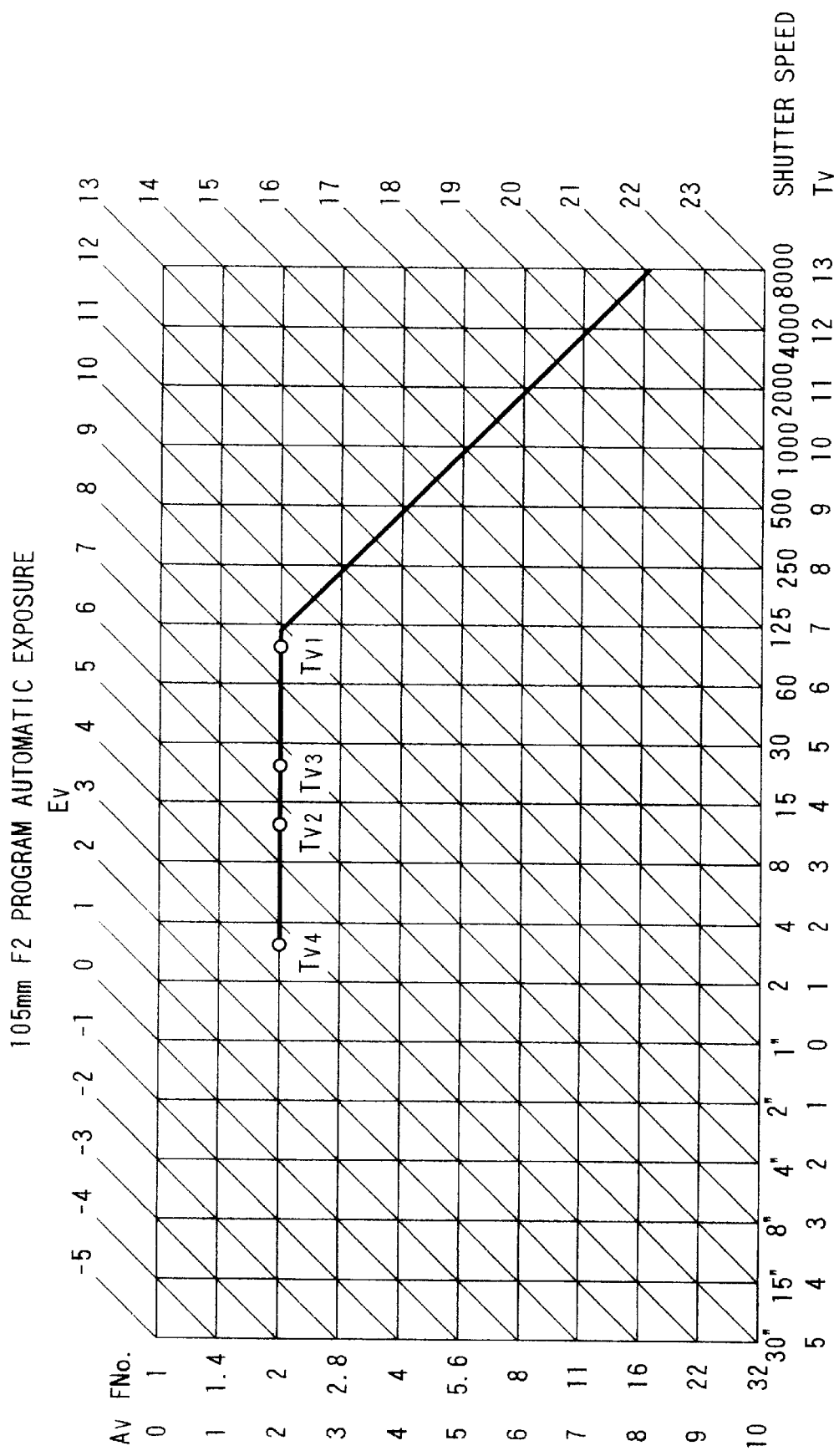
FIG. 3 is a program chart showing combinations of aperture value and shutter speed in a programmed automatic exposure.

In the following there will be explained the function of the above-explained exposure control device. FIGS. 2A and 2B are flow charts of the control sequence in the first embodiment of the exposure control device, and FIG. 3 is a program chart showing the combination of the shutter speed and the aperture value in a programmed auto exposure mode.

The sequence of FIG. 2A is initiated when an unrepresented main switch is turned on, and, when the shutter release button (switch SW 24) is depressed by a half stroke in a step S201, the sequence proceeds to a step S202. If this step identifies that the image vibration control release switch SW 13 is off, there is assumed a photographing mode with the image vibration correction control and a step S203 initiates the detection of image vibration. On the other hand, if the image vibration control release switch SW 13 is on, there is assumed a photographing mode without the image vibration correction control and the sequence proceeds to a step S204 without execution of the image vibration control.

The step S204 fetches the film speed by reading the DX code of the film cartridge through the DX contact terminals, and a step S205 meters the luminance of the object. Thus the exposure control unit 2 determines Tv and Av values. Thus, in case of the programmed exposure mode, if the phototaking lens is for example 105 mm/F2, the Tv and Av values are determined from the measured luminance value, according to the program chart shown in FIG. 3. The thus determined Tv and Av values are converted into respectively corresponding shutter speed and aperture value in a step S206, and these values are displayed by the display control circuit 23.

A step S207 measures the distance to the object and effects focusing to the object by driving the focusing lens 11.

Then a step S208 again discriminates the on-off state of the image vibration control release switch SW 13, and, if it is on, there is assumed the photographing mode without the image vibration correction control and the sequence proceeds to a step S209. If the step S209 identifies that the Tv value calculated by the exposure calculation unit 2 is smaller than $Tv_1$, the sequence proceeds to a step S212, but, if the Tv value is not less than $Tv_1$, the sequence proceeds to a step S222 in FIG. 2B. The value $Tv_1$ corresponds to the first image vibration discriminating shutter speed. Stated differently, as the image vibration tends to occur because of absence of the image vibration if the shutter speed corresponding to Tv is slower than (1/focal length). As an example, for a phototaking lens with a focal length of 105 mm, $Tv_1$ is 6.7 as shown in FIG. 3.

On the other hand, if the step S208 identifies that the image vibration control release switch SW 13 is off, there is assumed the photographing mode with the image vibration correction control. When the detection of image vibration is initiated, the sequence proceeds to a step S210 to discriminate whether the correction of image vibration by the image vibration correcting unit 1 is possible. The correction of image vibration is identified as possible if the maximum image vibration velocity $V_C$, detected after the start of the detection of image vibration by the angular velocity sensors 5, 6 shown in FIG. 1, does not exceed ½ of a maximum correctable velocity $V_D$. This discriminating loop is repeated until the full-stroke switch SW 25 is turned on. The comparison of $V_C$ and $V_D/2$ is adopted in order to have a certain safety margin, as the image vibration after the full-stroke depression of the shutter release button is difficult to predict.

If the step S210 identifies that the correction of image vibration is possible, the sequence proceeds to a step S211, and then to a step S212 or S222 respectively if the Tv value calculated by the exposure calculation unit 2 is smaller or not less than a value $Tv_2$. The value $Tv_2$ corresponds to the second image vibration discriminating shutter speed, and is determined on a principle that the correction of image vibration is possible if the value Tv, calculated from the metered luminance value, does not exceed 3 Tv above the ordinary image vibration limit value, owing to the image vibration correction control. As an example, for a phototaking lens with a focal length of 105 mm, $Tv_2$ is 3.7 as shown in FIG. 3.

Based on the results of comparison in the steps S209 and S211, the step S212 identifies the possibility of image vibration if the photographing operation is executed with the calculated Tv value, and causes the main CPU 3 to sends a flash photographing signal to the strobe light emitting circuit 26 in order to correct the image vibration by the flash photographing operation, whereupon a step S213 displays the selection of the flash photographing operation on the display unit.

Then referring to the flow chart shown in FIG. 2B, if a step S214 identifies that the flash photographing operation is not possible, the sequence proceeds to a step S215 for terminating the sequence for example by locking the shutter release button. Such a situation where the flash photographing operation is disabled may arise, for example, (1) in case of an externally mounted flash unit, if such flash unit is not mounted on the camera or is not charged, or (2) in case of an internally incorporated flash unit, if it is not popped up or is not charged.

In the sequence up to the step S212 explained in the foregoing, the value Tv for judging whether or not to effect flash light emission is varied to $Tv_1$ corresponding to the first image vibration discriminating shutter speed in case the correction of image vibration is not executed, or to $Tv_2$ corresponding to the second image vibration discriminating shutter speed in case the correction of image vibration is executed. In this manner it is rendered possible to achieve more detailed exposure control and to appropriately select the presence or absence of flash emission, thereby expanding the freedom of photographing operation.

Then a step S216 again discriminates whether or not to effect the image vibration correction control, and, if the image vibration control release switch SW 13 is on, there is assumed the photographing mode without the image vibration correction control, whereupon the sequence proceeds to a step S217 for comparing the calculated Tv value with $Tv_3$, corresponding to a first image vibration limiting shutter speed. Then the sequence proceeds to a step S218 or S222 respectively if it is smaller than or not less than $Tv_3$.

The value $Tv_3$, corresponding to the first image vibration limiting shutter speed is so set that the value Tv calculated by the exposure calculation unit 2 does not become smaller than $Tv_3$, thereby correcting the image vibration at the flash photographing operation.

However, for achieving the slow-sync flash photographing operation more effectively, $Tv_3$ is selected slower than $Tv_1$ by 2 Tv. For example, for a lens with a focal length of 105 mm, $Tv_3$=4.7 as shown in FIG. 3. In a step S218, there is selected $Tv=Tv_3$, thereby preventing Tv from becoming smaller than $Tv_3$ and thus preventing the image vibration at the slow-sync flash photographing operation.

On the other hand, if the step S216 identifies that the image vibration control release switch SW 13 is off, there is assumed the photographing mode with the image vibration correction control, whereupon the sequence proceeds to a step S219, which discriminates, as in the step S210, whether the image vibration can be corrected by the image vibration correcting unit 1.

If the step S219 identifies that the correction of image vibration is possible, the sequence proceeds to a step S220, and, if the step S220 identifies that Tv is smaller than or not less than a value $Tv_4$, corresponding to a second image vibration limiting shutter speed, the sequence respectively proceeds to a step S221 or S222. On the other hand, if the step S219 identifies that the correction of image vibration is impossible, the sequence proceeds to a step S217.

The value $Tv_4$, corresponding to the second image vibration limiting shutter speed, is selected smaller than $Tv_3$, corresponding to the first image vibration limiting shutter speed. This is because the image vibration is less likely to occur because of the vibration correcting function, even if Tv is smaller than $Tv_3$. The slow-sync flash photographing operation considered in the present embodiment is employed, for example in a portrait photographing, because a slower shutter speed is desirable for improving the balance of the entire photographed image as the object person can be illuminated by the strobe flash light but the background cannot be illuminated by the strobe flash light and tends to be underexposed.

Therefore, the value $Tv_4$, corresponding to the second image vibration limiting shutter speed, is selected further slower than $Tv_2$ by 2 Tv, for example $Tv_4$=1.7 for a lens with a focal length of 105 mm as shown in FIG. 3. Though the shutter speed at such condition $Tv_4$=1.7 is incapable of completely correcting the image vibration, the atmosphere of the photograph is not too much deteriorated since the background is not contained in the depth of focus.

However, as a further slower shutter speed may result in a very disagreeable image, such as overlapping of the background with the object person because of the image vibration, a step S221 selects a condition Tv=Tv$_4$, thereby preventing the shutter speed from becoming slower than Tv$_4$.

Thus, in the sequence of the steps S216 to S221, the limiting shutter speed is varied to Tv$_3$ or to Tv$_4$ respectively in case the correction of image vibration is executed or not. In this manner it is rendered possible to achieve more detailed control utilizing the vibration correcting function, thereby expanding the freedom of slow-sync flash photographing operation.

Then, when a step S222 identifies the half-stroke depression of the shutter release button (switch SW 24 being turned on), the sequence proceeds to a step S223, and, when this step identifies the full-stroke depression of the shutter release button (switch SW 25 being turned on), the sequence proceeds to a step S224. The step S224 again discriminates the state of the image vibration control release switch SW 13, and, if it is off, there is assumed the photographing mode without the image vibration correction control. Then a step S225 initiates the image vibration correction control by driving the vibration correcting lens 9, and the sequence proceeds to a step S226.

On the other hand, if the step S224 identifies that the image vibration control release switch SW 13 is on, there is assumed the photographing mode without the image vibration correction control, whereupon the sequence proceeds to the step S226. The step S226 executes a photographing operation with a shutter speed and an aperture value respectively corresponding to the Tv and Av values. Then a step S227 executes film winding, and the sequence is terminated.

The above-mentioned values Tv$_1$, Tv$_2$, Tv$_3$, Tv$_4$ can be determined, for example, in the following manner:

(1) by adopting fixed values as shown in the foregoing, for most frequently used lenses with focal lengths of 28 to 105 mm;

(2) by having a data table corresponding to various lenses and determining these values through reading of the focal length of the mounted lens; or (3) by calculation through reading of the focal length of the mounted lens.

[Second Embodiment]

In the following there will be explained a second embodiment of the exposure control device, in which components the same as those in the foregoing first embodiment will be represented by the same numbers and will not be explained further.

In the first embodiment, the possibility of correction of image vibration by the image vibration correcting unit 1 is discriminated according to whether the maximum image vibration velocity V$_C$ exceeds ½ of the maximum correctable vibration velocity V$_D$. In the second embodiment, the correction of image vibration is discriminated as possible if the error ε of successively detected image vibration does not exceed, for example 30 μm.

Figure 4A:
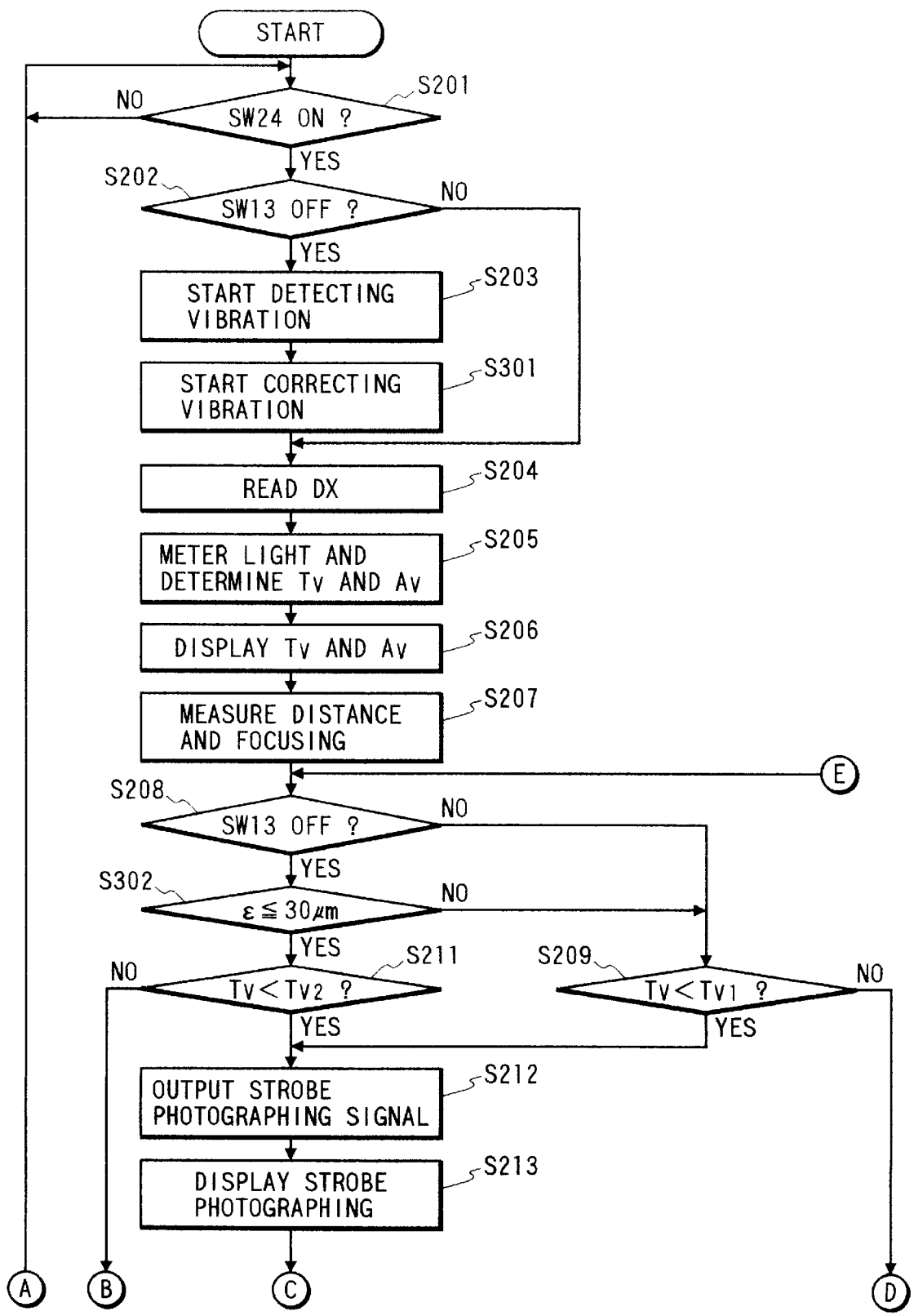
FIGS. 4A and 4B are flow charts showing the function of the exposure control device of a second embodiment.
Figure 4B:
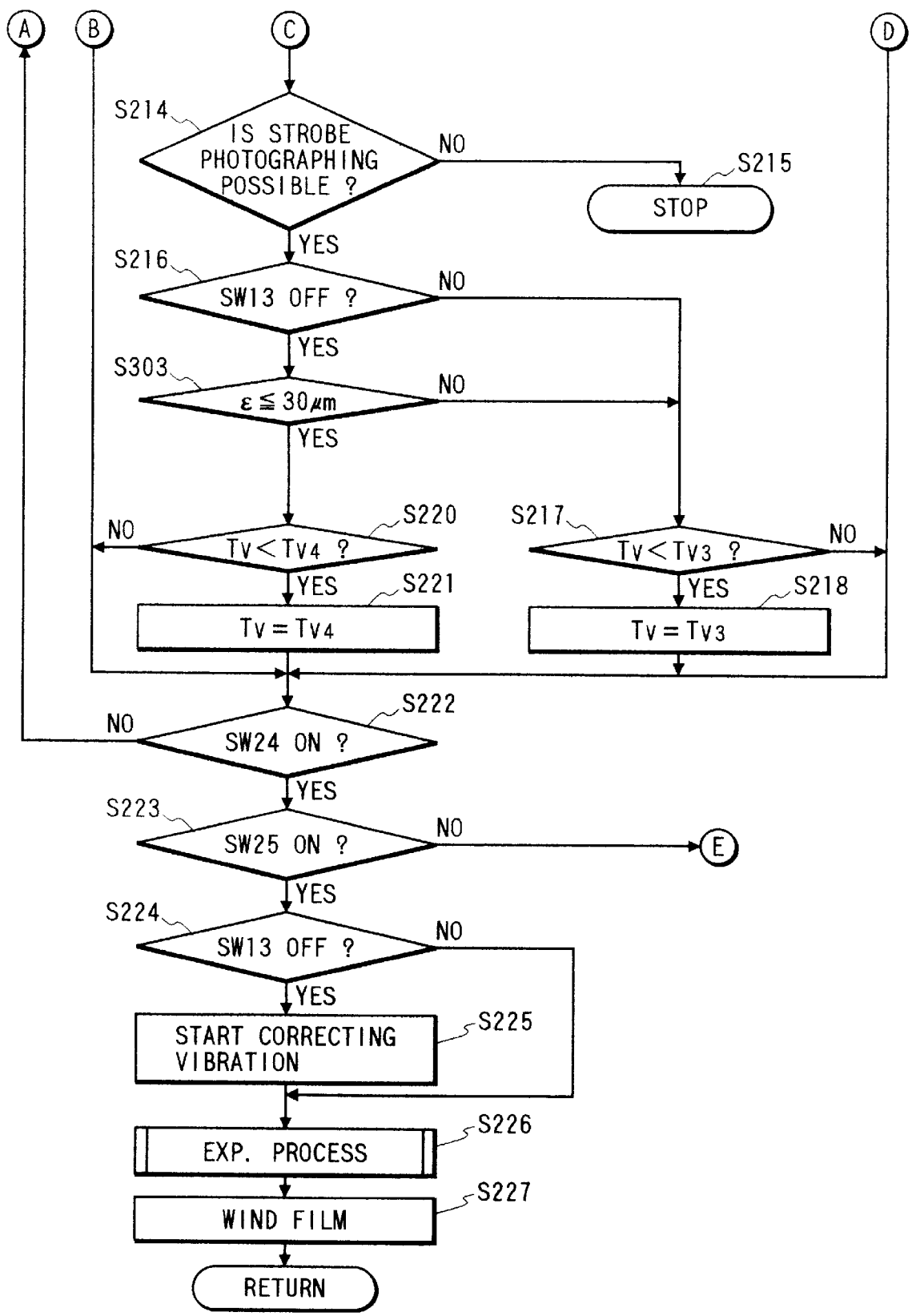

FIGS. 4A and 4B are flow charts showing the control sequence of the second embodiment of the exposure control device for a camera, wherein steps similar to those in FIGS. 2A and 2B are represented by same numbers. As shown in FIG. 4A, the correction of image vibration is started (step S301) between the steps S202 and S204. Then, if the error ε is identified as not exceeding 30 μm in a step S302 inserted between the steps S208 and S211 or in a step S303 inserted between the steps S216 and S220 in FIG. 4B, the image vibration is identified correctable and the sequence proceeds from the step S302 to S211, or from the step S303 to S220. On the other hand, if the error ε is identified as exceeding 30 μm, the image vibration is identified as not correctable and the sequence proceeds from the step S302 to S209 or from the step S303 to S217. Such sequence is repeated until the shutter release button is depressed by the full stroke (switch SW 25 being turned on). In this manner it is rendered possible to discriminate whether the correction of image vibration is possible, based on a principle different from that of the first embodiment.

[Third Embodiment]

Figure 5:
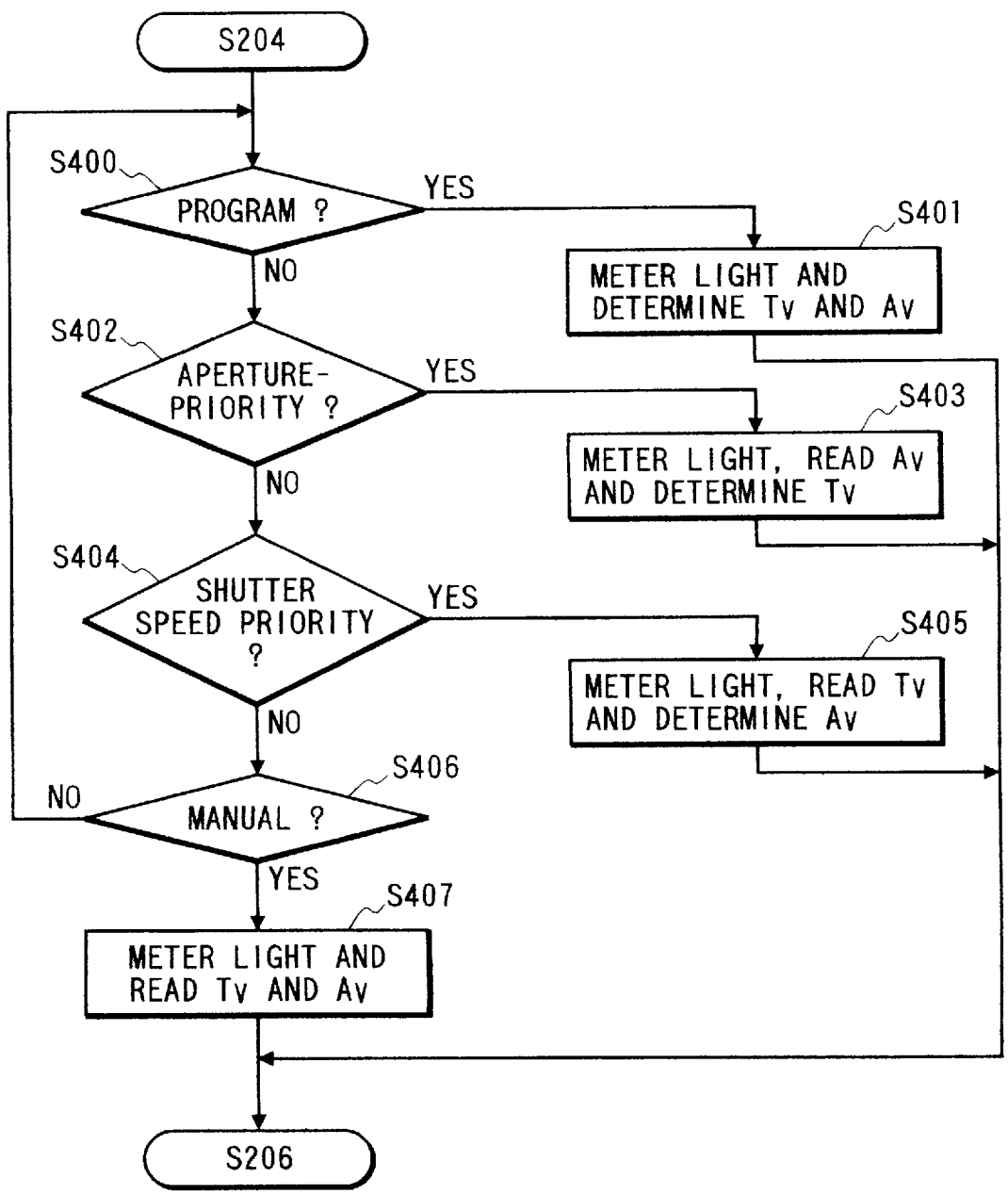
FIG. 5 is a flow chart showing an exposure determining method in a camera having multi-mode auto exposure.
Figure 6:
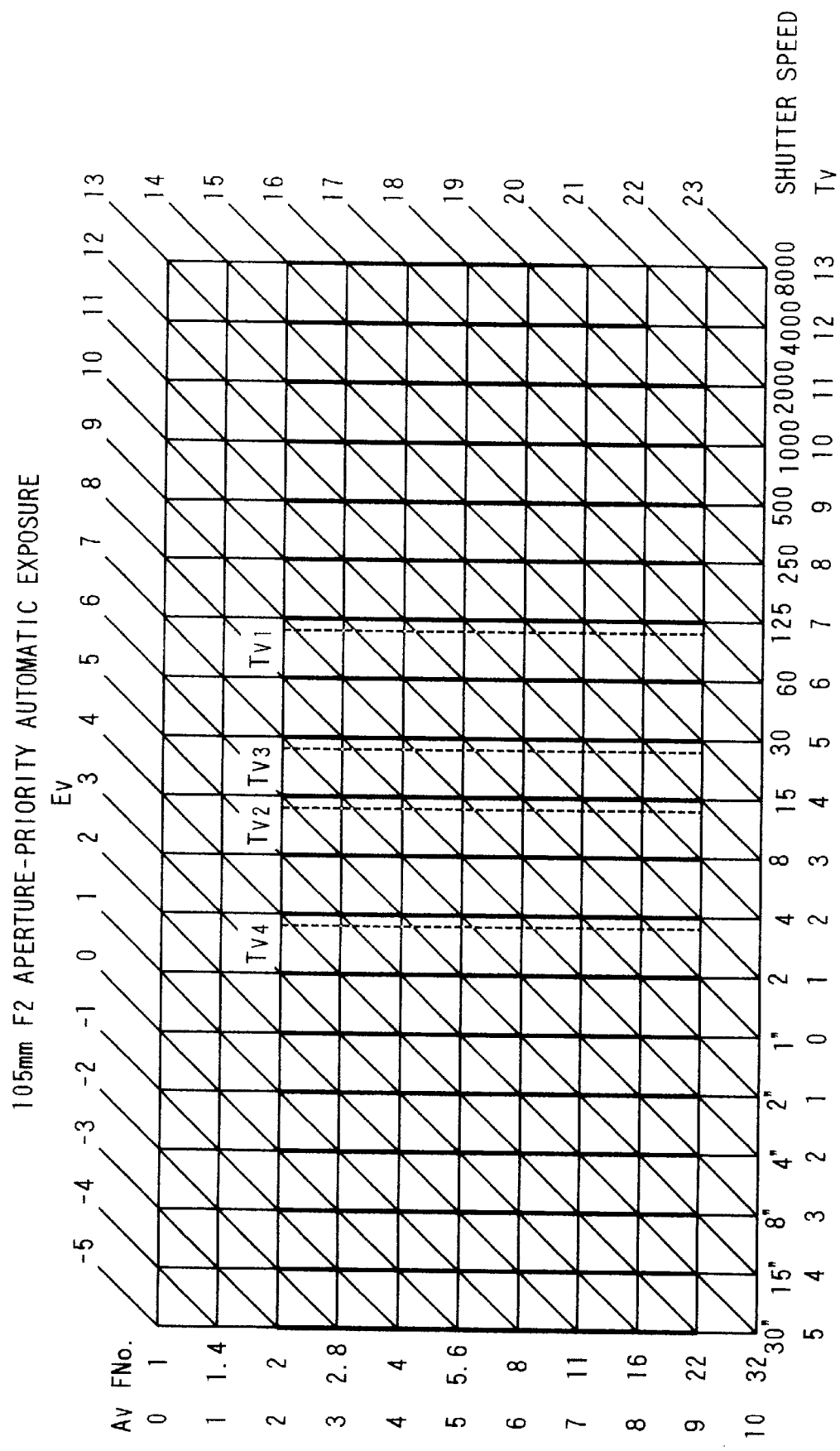
FIG. 6 is an aperture value shutter speed program chart in case of aperture priority auto exposure.

In contrast to the foregoing embodiments applied to a camera only having the programmed auto exposure mode, the present embodiment is applied to a camera having so-called multi-mode auto exposure function including, in addition to the programmed auto exposure mode, an aperture priority auto exposure mode, a shutter speed priority auto exposure mode and a manual exposure mode. FIG. 5 is a flow chart showing the exposure determining method in such case camera having the multi-mode auto exposure function. The flow chart in FIG. 5 corresponds to the step S205 in FIG. 2A or 4A and may be inserted between the steps S204 and S206 therein instead of the step S205. FIG. 6 is a program chart in case of the aperture priority auto exposure mode, and FIG. 7 is a program chart in case of the shutter speed priority auto exposure mode.

At first a step S400 discriminates whether the programmed auto exposure mode is selected, and, if selected, a step S401 determines the Tv and Av values and the sequence proceeds to the step S206. If the programmed auto exposure mode is not selected, a step S402 discriminates whether the aperture priority auto exposure mode is selected, and, if selected, a step S403 calculates the Tv value from a selected Av value, according to the program chart shown in FIG. 6 and based on the measured luminance value, and the sequence then proceeds to the step S206. If the aperture priority auto exposure mode is not selected, a step S404 discriminates whether the shutter speed priority auto exposure mode is selected.

Figure 7:
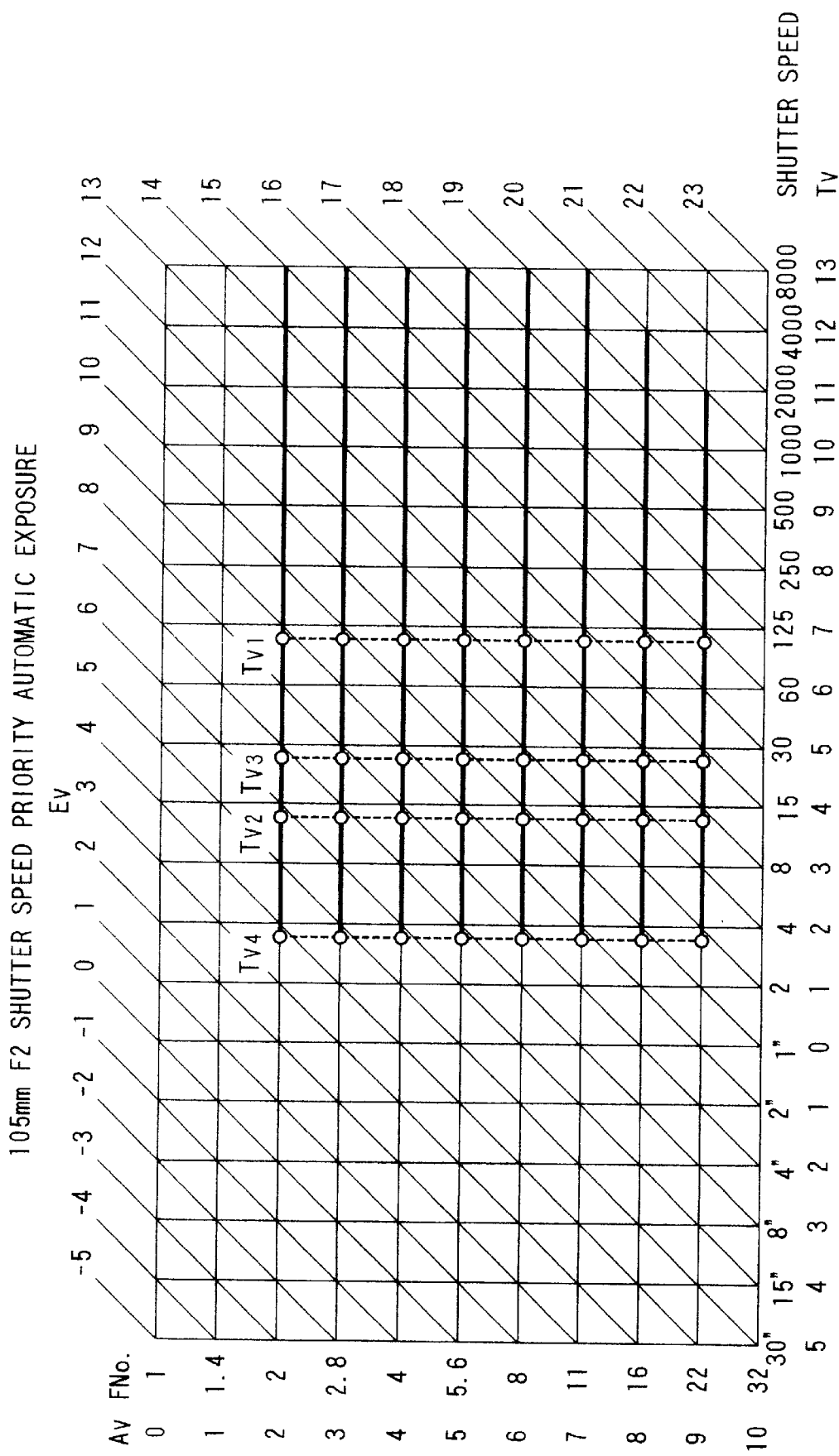
FIG. 7 is an aperture value shutter speed program chart in case of shutter speed priority auto exposure.

If it is selected, a step S405 calculates the Av value from a selected Tv value, according to the program chart shown in FIG. 7 and based on the measured luminance value, and the sequence then proceeds to the step S206. If the step S404 identifies that the shutter speed priority auto exposure mode is not selected, a step S406 discriminates whether the manual exposure mode is selected.

If the manual exposure mode is selected, the sequence proceeds to a step S407 in which the photographer sets the shutter speed and the aperture value based on a measured luminance value, and the sequence then proceeds to the step S206. If the step S406 identifies that the manual exposure mode is not selected, the sequence returns to the step S400 to repeat the discrimination of the exposure mode in a similar manner. In any of the programmed auto exposure mode, the aperture priority auto exposure mode, the shutter speed priority auto exposure mode and the manual exposure mode, there is executed, in the sequence starting from the step S206, the control of comparing the Tv value with Tv$_1$, Tv$_2$, Tv$_3$ and Tv$_4$ as in the first embodiment.

As explained in the foregoing, the present invention allows to appropriately select whether or not to use the strobe flash unit, in relation to the presence or absence of the image vibration correction control, and to effect the flash photographing operation with a suitable shutter speed, combined with the correction of image vibration.

Also the present invention allows a user to obtain an appropriate exposure, in relation to the presence or absence of the image vibration correction control.

What is claimed is:

1. An exposure control device for a camera, comprising:
   a correction unit to correct image vibration;
   a discrimination unit to discriminate whether the correction by said correction unit is possible;
   a determination unit to determine an exposure condition;
   a generation unit to generate a signal for effecting a photographing operation by a predetermined photographing method; and
   a selection unit to cause said generation unit to generate said signal to effect the photographing operation with said predetermined photographing method, in case said discrimination unit identifies that the correction by said correction unit is impossible and the exposure condition determined by said determination unit satisfies a first discriminating condition, and in case said discrimination unit identifies that the correction by said correction unit is possible and the exposure condition determined by said determination unit satisfies a second discriminating condition.

2. An exposure control device according to claim 1, wherein said predetermined photographing method is photographing with flash emission.

3. An exposure control device according to claim 1, wherein said exposure condition is a shutter speed.

4. An exposure control device according to claim 3, wherein said selection unit is adapted to cause said generation unit to generate said signal for effecting the photographing operation with said predetermined photographing method, in case said discrimination unit identifies that the correction by said correction unit is impossible and the shutter speed determined by said determination unit is slower than a first shutter speed, and in case said discrimination unit identifies that the correction by said correction unit is possible and the shutter speed determined by said determination unit is slower than a second shutter speed which is slower than said first shutter speed.

5. An exposure control device according to claim 1, further comprising:
   a limiting unit to limit the exposure condition determined by said determination unit as to satisfy a first limiting condition in case said discrimination unit identifies that the correction by said correction unit is impossible, and to limit the exposure condition determined by said determination unit as to satisfy a second limiting operation condition in case said discrimination unit identifies that the correction by said correction unit is possible.

6. An exposure control device according to claim 5, wherein said exposure condition is a shutter speed, and said limiting unit is adapted to limit the shutter speed determined by said determination unit as to be faster than a first limiting shutter speed in case said discrimination unit identifies that the correction by said correction unit is impossible, and to limit the shutter speed determined by said determination unit as to be faster than a second limiting shutter speed which is slower than said first limiting shutter speed in case said discrimination unit identifies that the correction by said correction unit is possible.

7. An exposure control device for a camera comprising:
   an image vibration correcting unit to correct image vibration by detecting the image vibration and driving an image vibration correcting optical system according to the result of such detection;
   an image vibration correction discriminating unit to discriminate whether the correction of image vibration by said image vibration correcting unit is possible;
   a shutter speed determining unit to determine a shutter speed;
   a flash photographing signal generation unit to generate a signal for effecting a flash photographing operation; and
   a flash photographing selection unit to cause said flash photographing signal generation unit to generate said flash photographing signal in case said image vibration correction discriminating unit identifies that the correction of image vibration is impossible and the shutter speed determined by said shutter speed determining unit is slower than a first image vibration discriminating shutter speed, and in case said image vibration correction discriminating unit identifies that the correction of image vibration is possible and the shutter speed determined by said shutter speed determining unit is slower than a second image vibration discriminating shutter speed which is slower than said first image vibration discriminating shutter speed.

8. An exposure control device according to claim 7, further comprising a shutter speed limiting unit to limit the shutter speed determined by said shutter speed determining unit as not to be slower than a first image vibration limiting shutter speed in case said image vibration correction discriminating unit identifies that the correction of image vibration is impossible, and to limit the shutter speed determined by said shutter speed determining unit as not be slower than a second image vibration limiting shutter speed slower than said first image vibration limiting shutter speed in case said image vibration correction discriminating unit identifies that the correction of image vibration is possible.

* * * * *